United States Patent

[11] 3,602,412

[72] Inventors John A. Altonji Syosset; Murray D. Lawrence, Bronx, both of, N.Y.
[21] Appl. No. 788,463
[22] Filed Jan. 2, 1969
[45] Patented Aug. 31, 1971
[73] Assignee Potter Instrument Company, Inc. Plainview, N.Y.

[54] AIR BEARING FOR MAGNETIC TAPE
4 Claims, 6 Drawing Figs.

[52] U.S. Cl. 226/97, 226/114, 226/195
[51] Int. Cl. B65h 17/32
[50] Field of Search 226/97, 195, 7, 44, 114

[56] References Cited

UNITED STATES PATENTS

| | | | |
|---|---|---|---|
| 2,989,265 | 6/1961 | Selsted | 226/97 X |
| 3,315,861 | 4/1967 | Metzger | 226/97 X |
| 3,319,237 | 5/1967 | Jones | 226/44 X |
| 1,189,611 | 7/1916 | Morse | 226/195 X |

*Primary Examiner*—Richard A. Schacher
*Attorney*—Brufsky, Staas, Breiner & Halsey

ABSTRACT: A high speed magnetic tape loop transport system having an air bearing for tensioning the tape. The air bearing floats and therefore does not steer the tape loop.

INVENTORS
JOHN A. ALTONJI
MURRAY D. LAWRENCE

BY Brufsky and Staas
ATTORNEYS

INVENTORS
JOHN A. ALTONJI
MURRAY D. LAWRENCE

BY Brufsky and Staas
ATTORNEYS

INVENTORS
JOHN A. ALTONJI
MURRAY D. LAWRENCE

BY Brufsky and Staas
ATTORNEYS

AIR BEARING FOR MAGNETIC TAPE

BACKGROUND OF THE INVENTION

This invention generally relates to a high speed transport system for a magnetic tape information memory.

Magnetic tape information memories are used in digital computers and other data processing equipment to store information. In order to obtain quick access to the information stored at a selected location on the tape, the tape must be driven at a very high speed and the information on the tape must be accurately positioned beneath a read head.

A serious problem encountered in such magnetic tape handling units is skewing of the tape as it passes over the read head. The bits of information are stored on the tape in a plurality of closely spaced longitudinal tracks. Any skewing of the tape relative to transducer may result in a false reading. Consequently, it is important to accurately guide the tape in the region of the head.

In order to accomplish this objective, it is necessary to provide guides around the head in order to properly align the tape with the transducers in the read head. However, these guides tend to wear the tape edge if the tape is steered into the guide.

SUMMARY OF THE INVENTION

Briefly, the high speed transport system in accordance with the invention includes a drive capstan for frictionally driving the magnetic tape information memory past a transducing means. A floating air bearing adjustably tensions the tape. Owing to the fact that the air bearing itself floats, it is steered by the tape rather than steering the tape as in prior art air bearings.

Accordingly, it is an object of this invention to provide a high speed transport system for a magnetic tape information memory.

A further object of this invention is to provide a high speed tape transport system for a magnetic tape loop information memory in which edge wear of the tape is reduced.

Further objects and advantages of the invention will become apparent from the following specification and claims, and from the accompanying drawings, wherein:

DESCRIPTION OF THE PREFERRED EMBODIMENT

Figures 1, 2:
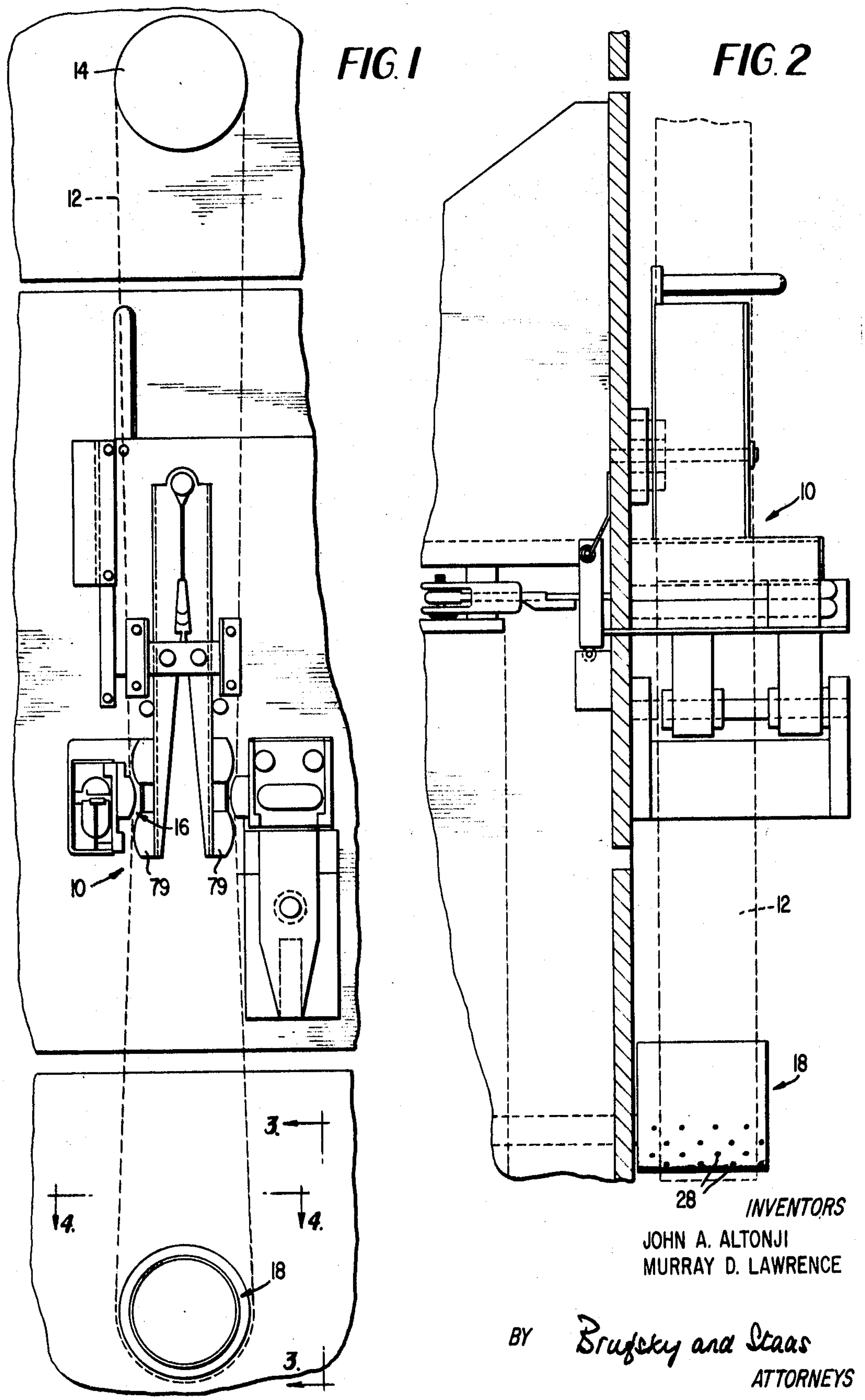
FIG. 1 is a fragmentary front view in elevation of the magnetic tape transport system of the present invention.
FIG. 2 is a fragmentary side view in elevation of the magnetic tape transport system as seen from the left-hand side of FIG. 1.

Referring now to the drawings in detail, wherein like numerals indicate like elements throughout the several views, the tape transport system of the present invention is generally indicated by the numeral 10. For purposes of illustration, information in a binary form is stored on a magnetic tape loop 12 supported at one end by a rotatable capstan 14, which frictionally drives the tape 12 past transducers in a read head 16. Capstan 14 is conventional in the art and comprises a cylindrical drum driven by an electric motor (not shown).

The tape transport system 10 includes a floating air bearing generally designated by the numeral 18, to tension tape loop 12.

The floating air bearing 18 is a hollow cylindrical drum having outer and inner concentric walls 20 and 22 defining an air chamber 24 therebetween extending about the circumference of the drum. Inner wall 22 includes an air inlet 26 adapted to be placed in communication with a source of pressurized air, as will be described hereinafter.

A plurality of orifices 28 are provided in the bottom sector of outer wall 20 of air bearing 18. Air supplied to air chamber 24 through air inlet 26 can escape through orifices 28 and impinge upon tape loop 12 to provide an air film lubricant.

Depending from the inner wall 22 of air bearing 18 is an annular bearing 30 having a conical bore 32. The sides of bore 32 are seated on the substantially hemispherically shaped head 33 of an air nozzle 34. The lower portion 36 of air nozzle 34 is in sliding engagement with the interior of an L-shaped pipe 38. The upper end of pipe 38 normally abuts annular shoulder 40 on nozzle 34 to support the nozzle, which in turn pivotally supports air bearing 18, through contact with the conical surfaces surrounding bore 32 on bearing 30. Air is supplied through pipe 38 into the interior of nozzle 34 and directed into the interior of air chamber 24 through air inlet 26.

Welded to pipe 38, within the interior of air bearing 18, is a generally U-shaped bracket 42 having a pair of upright, spaced legs 44 and 46. Integrally connected to the bottom surface of inner wall 22 is a second U-shaped bracket 48 also having a pair of upright, spaced legs 50, 52. Leg 50 of bracket 48 is parallel to let 46 of bracket 42 and is closely adjacent thereto. Similarly, leg 52 of bracket 48 is generally parallel to leg 44 of bracket 42 and in close proximity thereto. The adjacent surfaces of legs 46, 50 and legs 44, 52 prevent air bearing 18 from rotating about its longitudinal axis. The movement of air bearing 18 about head 33 of nozzle 34 is thus restructed to a rocking motion about its transverse, vertical axis.

Welded to bracket 42 and straddling pipe 38 is a ring-shaped bracket 54. A bellows 56 surrounds nozzle 34 and has one end connected by an annular seal 58 to the outer annular surface 59 of bracket 54 and its other end connected by an annular seal 60 to the outer surface of bearing 30. A coil spring 62 is disposed between the inner annular surface 64 of ring-shaped bracket 54 and an annular shoulder 66 beneath the head 33 of air nozzle 34, to urge the nozzle into contact with the conical surface surrounding bore 32.

Figure 3:
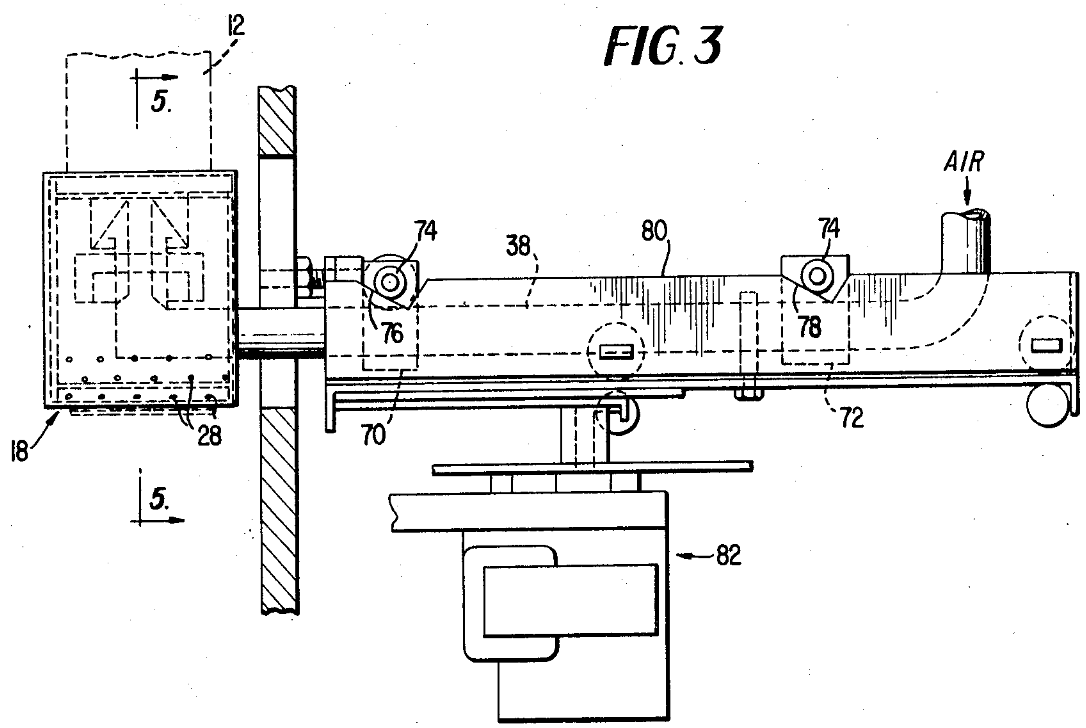
FIG. 3 is a cross-sectional view taken substantially along the plane indicated by line 3—3 of FIG. 1.
Figure 4:
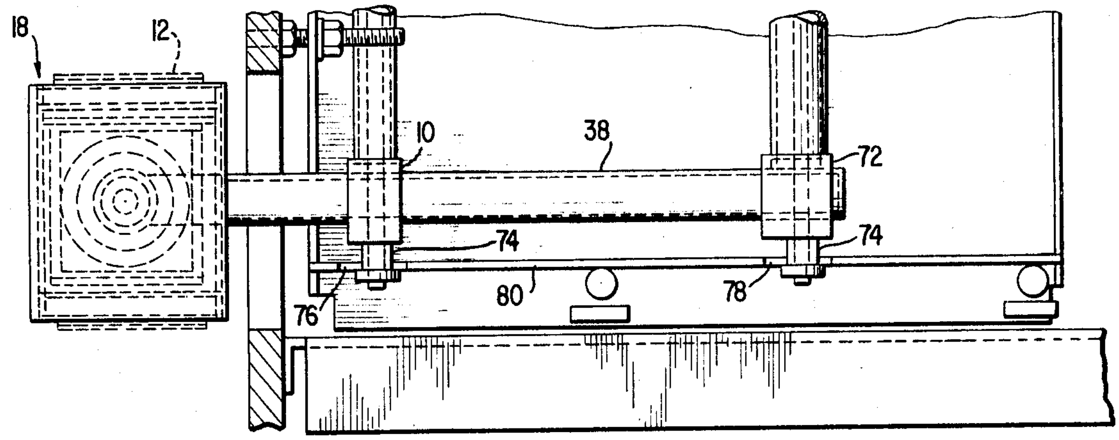
FIG. 4 is a cross-sectional view taken substantially along the plane indicated by line 4—4 of FIG. 1.

As shown in FIGS. 3 and 4, pipe 38 is adapted to be raised and lowered. Pipe 38 is supported in a pair of spaced bearing blocks 70, 72. A cam roller is connected to each bearing block. Rollers 74 rest on inclined cam surfaces 76 and 78 formed on a plate 80 adapted to be reciprocated by any conventional reciprocating drive mechanism 82, adapted to translate rotary into linear motion, such as an eccentric and link arrangement, rack and pinion, etc.

Movement of plate 80 to the right in FIGS. 3 and 4 will cause cam rollers 74 to ride up on inclined cam surfaces 76 and 78, raising bearing blocks 70, 72 and pipe 38. Movement of plate 80 to the left in FIGS. 3 and 4 will reverse the movement of the cam rollers 74 to lower pipe 38.

In operation, tape loop 12 is first disposed about capstan 14 in close proximity to the read head 16. Pipe 38 is then raised to enable tape loop 12 to be positioned about air bearing 18. The end of pipe 38 within the interior of air bearing 18 will push upwardly on shoulder 40 of air nozzle 34 which in turn will contact the conical surface of bore 32 to raise the air bearing 18 and allow positioning of tape loop 12 about the bearing structure. Pipe 38 is then lowered until the weight of the bearing is brought to rest on the tape loop, tensioning the tape. Pressurized air is then transmitted through pipe 38, nozzle 34, and air inlet 26, into air chamber 24. Air within chamber 24 will be directed through orifices 28 to impinge upon the tape loop 12 to provide a lubricant between it and the air bearing 18.

The net force exerted by the air bearing provides the tension required to exert a driving force at the capstan 14. This net force is the weight of the air bearing 18 minus the reactive force exerted in the opposite direction, or vertically upward, due to the internal pressure of the air in bearing 18.

Rotatable conventional tape guides 79, which form a vertical channel, prevent skewing of tape 12 as it is driven by capstan 14 past read head 16. The self-aligning properties of the air bearing 18 maintain the longitudinal axis of air bearing 18 in a position which will cause no side thrusts to be exerted on the tape loop 12, or prevent the bearing from steering the tape into the guides 79. The air bearing 18 will rock about its vertical transverse axis to position its longitudinal axis in substantial parallelism with the capstan 14 and the tape guides which have been previously rotated into a longitudinal axis alignment. The aligning forces brought to bear on bearing 18 will cause it to pivot on the head of nozzle 34 until its transverse, vertical axis is aligned with the center line of the tape loop 12. Air bearing 18 automatically "floats" and is self-aligning with the longitudinal center of the tape loop 12. The low thrust forces on the tape encountered in the aligned system results in the virtual elimination of edge wear on the tape.

The pivotal movement of the air bearing is restricted by adjacent brackets 42, 48 to the plane defined by the substantially parallel axes of the capstan 14 and air bearing 18.

Figure 6:
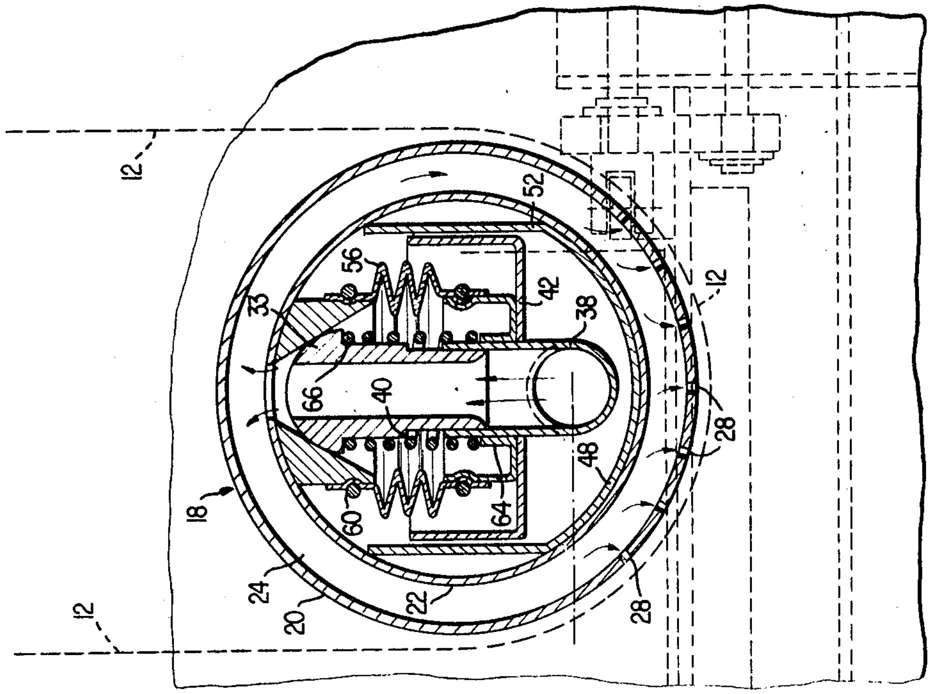
FIG. 6 is a view similar to FIG. 5, but illustrating the air bearing turnaround in a different phase of operation.
Figure 5:
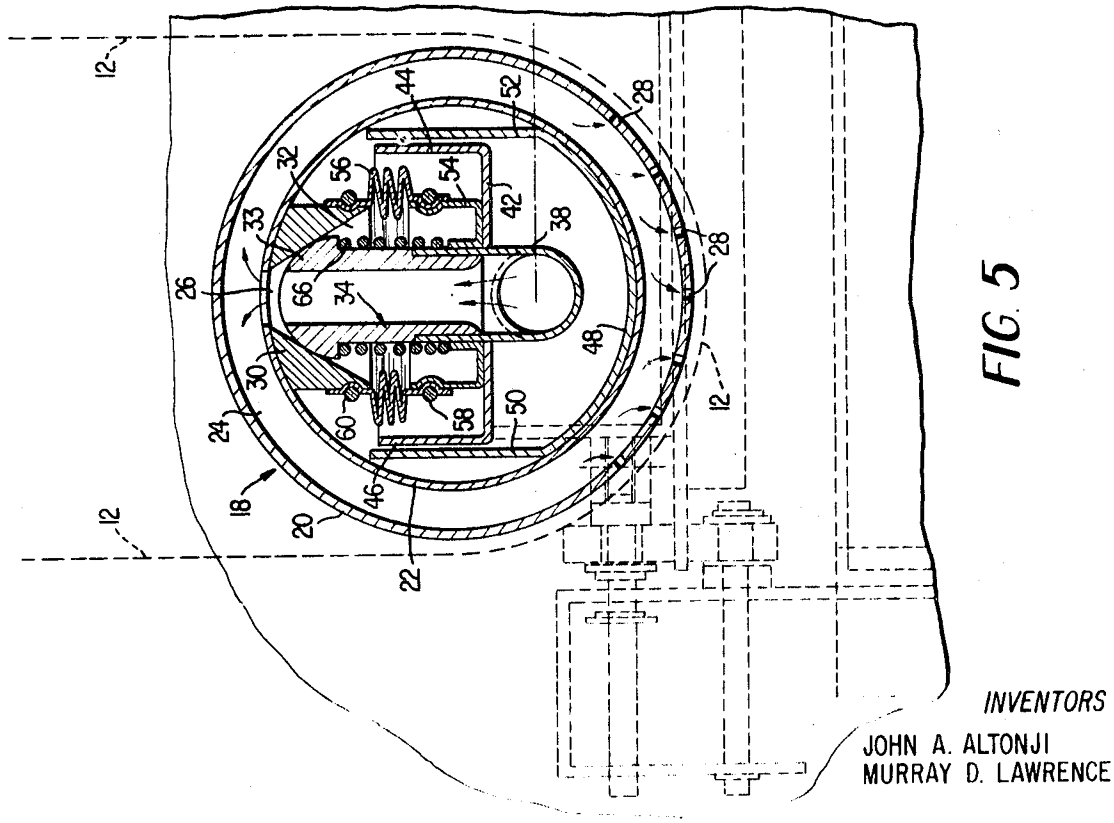
FIG. 5 is a cross-sectional view taken substantially along the plane indicated by line 5—5 of FIG. 3, and illustrating the details of construction of the air bearing turnaround used in the magnetic tape transport system of the present invention.

To adjust the tension on the tape loop 12 the airflow through pipe 38 is increased. Because of the size of the orifices 28, the increase in air pressure will cause an air leakage from nozzle 34 around its head 33 into the interior of the bellows 56. The bellows will expand from the position illustrated in FIG. 5 to the position illustrated in FIG. 6, drawing air into it and building up pressure on the conical surfaces surrounding bore 32 beneath head 33. This pressure will tend to raise the bearing 18 away from the tape, decreasing tension on the tape. The greater the increase in the air pressure the less the tension on the tape. Coil spring 54 will allow expansion of bellows 56 but retain the head of the nozzle 34 in close supporting engagement with the air bearing 18 at all times.

What we claim is:

1. A high speed transport system for driving a magnetic tape past a transducing means for performing transducing operations on said magnetic tape, said transport system comprising:

drive means for driving said tape past said transducing means and including a first cylindrical drum rotatable about a longitudinal axis thereof, said first drum supporting and frictionally driving said tape, means for tensioning said tape including a floating bearing comprising a second cylindrical drum having a longitudinal axis substantially parallel to the longitudinal axis of said first drum, said second drum including inner and outer connected, concentric walls defining an air chamber extending about the circumference thereof, said air chamber having an air inlet adapted to be connected to a source of pressurized air, orifice means along a sector of said outer wall for directing air supplied to said air chamber against said tape to move said tape away from said outer wall thereby lubricating said tape, and means pivotally supporting said inner wall for movement in a plane defined by the substantially parallel longitudinal axes of said first and second drums, whereby said axes can be maintained in substantially parallel relation to prevent steering of said tape.

2. A high speed transport system in accordance wit claim 1, wherein said support means includes an air nozzle having a substantially rounded head in communication with said air chamber through said air inlet, and a conical surface depending from said inner wall seated on the head of said nozzle.

3. A high speed transport system in accordance with claim 1 including means within said second drum for limiting pivotal movement of said inner wall to said plane.

4. A high speed transport system in accordance with claim 3, wherein said limiting means includes a first bracket connected to said inner wall having a pair of spaced parallel flanges, and a second bracket connected to said support means having a flange parallel and adjacent to each of the flanges of said first bracket.